US010567726B2

(12) United States Patent
Ma et al.

(10) Patent No.: US 10,567,726 B2
(45) Date of Patent: Feb. 18, 2020

(54) METHOD, APPARATUS OR SYSTEM FOR IMAGE PROCESSING

(75) Inventors: Jian Ma, Beijing (CN); Ye Tian, Chongqing (CN); Xiaogang Yang, Beijing (CN); Wendong Wang, Beijing (CN)

(73) Assignee: Nokia Technologies Oy, Espoo (FI)

( * ) Notice: Subject to any disclaimer, the term of this patent is extended or adjusted under 35 U.S.C. 154(b) by 392 days.

(21) Appl. No.: 13/509,796

(22) PCT Filed: Dec. 10, 2009

(86) PCT No.: PCT/CN2009/075454
§ 371 (c)(1),
(2), (4) Date: May 15, 2012

(87) PCT Pub. No.: WO2011/069291
PCT Pub. Date: Jun. 16, 2011

(65) Prior Publication Data
US 2012/0233531 A1    Sep. 13, 2012

(51) Int. Cl.
*G06F 17/00*    (2019.01)
*H04N 9/82*    (2006.01)

(52) U.S. Cl.
CPC ................................ *H04N 9/8205* (2013.01)

(58) Field of Classification Search
CPC ............ G06F 17/241; G06F 17/30265; H04N 1/32128; H04N 2201/3253
USPC ................................ 715/201, 203, 230, 233
See application file for complete search history.

(56) References Cited

U.S. PATENT DOCUMENTS

| | | | | |
|---|---|---|---|---|
| 5,708,825 A * | 1/1998 | Sotomayor | .......... | G06F 17/2235 707/E17.013 |
| 7,275,063 B2 * | 9/2007 | Horn | .................... | G06F 17/3002 |
| 7,478,125 B2 * | 1/2009 | Chang | ................ | G06F 17/30265 707/999.001 |
| 8,495,489 B1 * | 7/2013 | Everingham | .......... | G06Q 50/01 707/621 |
| 8,937,669 B2 * | 1/2015 | Kitajima | ............ | G06F 17/30265 348/231.6 |
| 9,147,202 B1 * | 9/2015 | Muse | .................. | G06Q 30/0277 |
| 9,317,531 B2 * | 4/2016 | Baker | ................ | G06F 17/30265 |

(Continued)

FOREIGN PATENT DOCUMENTS

| CN | 1697520 A | 11/2005 |
|---|---|---|
| CN | 101395607 A | 3/2009 |

(Continued)

OTHER PUBLICATIONS

Office Action received for corresponding Chinese Application No. 200980162638.2, dated May 9, 2014, 13 pages.

(Continued)

*Primary Examiner* — Stephen S Hong
*Assistant Examiner* — Matthew J Ludwig
(74) *Attorney, Agent, or Firm* — Alston & Bird LLP

(57) ABSTRACT

A method, apparatus, system for image processing is provided that creates an object note for a picture. The method, apparatus or system includes: automatically obtaining picture description information from a picture source, wherein the picture description information at least partly have been formed automatically; obtaining annotation information from at least two object sources, wherein the two object sources are different from the picture sources, automatically fusing the said annotation information from the two object sources to form fused annotation information, and attaching said fused annotation information to the picture to create the object note for the picture.

20 Claims, 13 Drawing Sheets

(56) References Cited

U.S. PATENT DOCUMENTS

| | | | |
|---|---|---|---|
| 2005/0050032 A1 | 3/2005 | Lee | |
| 2005/0055639 A1 | 3/2005 | Fogg | |
| 2005/0268220 A1* | 12/2005 | Tanaka | 715/512 |
| 2007/0094611 A1* | 4/2007 | Sasaki | 715/804 |
| 2007/0162447 A1* | 7/2007 | Joshi | G06F 17/30705 |
| 2008/0195664 A1* | 8/2008 | Maharajh | G06F 17/30035 |
| 2009/0023515 A1 | 1/2009 | Tarao | |
| 2009/0235155 A1* | 9/2009 | Ueda | 715/233 |
| 2009/0292678 A1 | 11/2009 | Kawanishi | |
| 2010/0241626 A1 | 9/2010 | Lee | |
| 2010/0332498 A1* | 12/2010 | Svore | G06F 16/345 707/759 |
| 2011/0040752 A1* | 2/2011 | Svore | G06F 16/338 707/728 |
| 2012/0260209 A1* | 10/2012 | Stibel | G06Q 40/02 715/780 |
| 2013/0282759 A1* | 10/2013 | Proux | G06F 17/30864 707/774 |

FOREIGN PATENT DOCUMENTS

| | | |
|---|---|---|
| EP | 1596562 A1 | 11/2005 |
| JP | 2009-246503 A | 10/2009 |
| JP | 2009223521 | 10/2009 |
| KR | 20080029601 | 4/2008 |
| WO | 2009/070841 A1 | 6/2009 |

OTHER PUBLICATIONS

Liu et al., "Research on a Model of Context-Driven Similarities Computation Between Data Objects", Future Generation Communication and Networking, vol. 1, Dec. 6-8, 2007, 6 pages.

Tuffield et al., "Image Annotation With Photocopain", In Proceedings of Semantic Web Annotation of Multimedia Workshop at the World Wide Web Conference, May 22-26, 2006, 14 pages.

Extended European Search Report received for corresponding European Patent Application No. 09851971.3, dated Apr. 8, 2013, 4 pages.

International Search Report and Written Opinion received for corresponding International Patent Application No. PCT/CN2009/075454, dated Sep. 9, 2010, 17 pages.

Office Action received for corresponding Korean Application No. 2012-7017854, dated Sep. 19, 2013, 2013, 13 pages.

International Preliminary Report on Patentability received for corresponding Patent Cooperation Treaty Application No. PCT/CN2009/075454, dated Jun. 12, 2012, 9 pages.

Office Action for European Application No. 09 851 971.3 dated Mar. 6, 2018, 11 pages.

* cited by examiner

| Photo-id | date | time | gps | location | persons | event | cluster |
|---|---|---|---|---|---|---|---|
| 1 | 2009-08-13 | 14:26:45 | 39'324 116'234 | BUPT | Zhang Lin | Long Jump | 1 |
| 2 | 2009-08-13 | 14:39:43 | 39'324 116'234 | BUPT | Lee,Tom, Lin, Zhang | 4*100 relay race | 1 |
| 3 | 2009-08-23 | 15:09:23 | 39'36 116'25 | Tian An Men | Lee, Jack | Tourist | 2 |
| 4 | 2009-08-13 | 14:41:43 | 39'324 116'234 | BUPT | Lee,Tom, Lin, Zhang | 4*100 relay race | 1 |

Fig. 9

| Cluster_id 1020 | event 1022 | Event_count 1024 |
|---|---|---|
| 1 | Long Jump | 1 |
| 1 | 4*100 relay race | 2 |
| 2 | Tourist | 1 |
| ... | ... | ... |

| Cluster_id 1040 | person 1042 | Person_count 1044 |
|---|---|---|
| 1 | Zhang Lin | 1 |
| 1 | Lee,Tom, Lin, Zhang | 2 |
| 2 | Lee, Jack | 1 |
| ... | ... | ... |

Fig. 10

METHOD, APPARATUS OR SYSTEM FOR IMAGE PROCESSING

RELATED APPLICATION

This application was originally filed as PCT Application No. PCT/CN2009/075454 filed Dec. 10, 2009.

BACKGROUND

The increase in availability of digital cameras, especially those in camera phones, has increased the number of pictures and video shots a person may have and need to manage. Pictures and video shots can be stored on a computer or in a web service after they have been recorded with a camera, or the camera or camera phone might have a large memory and the user may decide to store the digital content on the device. Regardless of place of storage, managing possibly thousands of pictures and keeping track of the best shots is challenging.

There is, therefore, a need for a solution that makes it easier to manage pictures and videos for an active user of a camera and to find data that are relevant to those pictures and videos.

SUMMARY

Now there has been invented an improved method and technical equipment implementing the method, by which the above problems are alleviated. Various aspects of the invention include a method, an apparatus, a server, a client and a computer readable medium comprising a computer program stored therein, which are characterized by what is stated in the independent claims. Various embodiments of the invention are disclosed in the dependent claims.

The present invention relates to a method, apparatuses and a system for cross-object information retrieval and summarization; especially for finding the relevant objects of a specific object like a photographic image or video based on analyzing multidimensional object contexts and at least partly automatic generation of object summarization from the relevant objects. First, finding the relevant objects of an object by multidimensional object context similarity computing may be carried out, the result of which is also called hyper-object-link. Second, object summarization from the relevant objects may be created, and a fusion of the object summaries is used to create a smart annotation for the specific object like a picture or video, which is also called hyper-object-note. In other words, there is provided an approach to find relevant objects through an entry object like photo by means of a hyper-object-link. Based on the relevant relation, a hyper-object-note which may give brief description of the activity scene is generated at least partially automatically. Object notes may relate to different kinds of data objects including various media objects like image, photo, audio, video, music, books, papers and any other useful objects.

According to a first aspect, there is provided a method comprising automatically obtaining picture description information from a picture source, wherein the picture description information having been formed at least partly automatically, obtaining annotation information from at least two object sources, wherein the at least two object sources are different from the picture source, automatically fusing the annotation information from the at least two object sources to form fused annotation information, and attaching the fused annotation information to the picture to create an object note for the picture.

According to an embodiment the method further comprises forming a hyper-object-link between the picture and at least one object source, wherein the hyper-object-link comprises a link to an object in the object source and attaching the link to the object to the picture to create an object note for a picture. According to an embodiment the method further comprises forming relevance information by automatically analyzing information from the two sources against information from the picture source, and obtaining the annotation information from the at least two sources based on the relevance information. According to an embodiment the method further comprises forming the relevance information by determining a correlation between the picture and the at least two sources by determining their similarity using at least one of the group of time information, location information, event information and person information and forming a weighted similarity indicator by using the at least one of the group of time information, location information, event information and person information. According to an embodiment the at least two sources are one two or more of email messages, short messages, multimedia messages, instant messages, calendar entries, contact cards, blog entries, wiki entries and social network service entries. According to an embodiment the method further comprises clustering pictures based on the annotation information from the at least two sources. According to an embodiment the method further comprises receiving filter information or source selection information from the user for restricting the data from the at least two sources. According to an embodiment forming the fused annotation information comprises selecting the content for annotation from source content, filtering the selected content to reduce irrelevant and redundant information, and enhancing the cohesion and coherence of the content. According to an embodiment forming the fused annotation information comprises generating summarization of the content through natural language processing.

According to a second aspect there is provided an apparatus comprising at least one processor, memory including computer program code, the memory and the computer program code configured to, with the at least one processor, cause the apparatus to obtain picture description information from a picture source, wherein the picture description information having been formed at least partly automatically, to obtain annotation information from at least two object sources, wherein the at least two object sources are different from the picture source, to automatically fuse the annotation information from the at least two object sources to form fused annotation information, and to attach the fused annotation information to the picture to create an object note for the picture.

According to an embodiment, the apparatus further comprises computer program code configured to, with the at least one processor, cause the apparatus to form a hyper-object-link between the picture and at least one object source, wherein the hyper-object-link comprises a link to an object in the object source, and to attach the link to the object to the picture to create an object note for a picture. According to an embodiment, the apparatus further comprises computer program code configured to, with the at least one processor, cause the apparatus to form relevance information by automatically analyzing information from the two sources against information from the picture source, and to obtain the annotation information from the at least two sources based on the relevance information. According to an embodiment, the apparatus further comprises computer program code configured to, with the at least one processor, cause the apparatus to form the relevance information by determining a correlation between the picture and the at least two sources by determining their similarity using at least one of the group of time information, location information, event information and person information and to form a weighted similarity indicator by using the at least one of the group of time information, location information, event information and person information. According to an embodiment, the at least two sources comprise at least two of the group of email messages, short messages, multimedia messages, instant messages, calendar entries, contact cards, blog entries, wiki entries and social network service entries. According to an embodiment, the apparatus further comprises computer program code configured to, with the at least one processor, cause the apparatus to cluster pictures based on the annotation information from the at least two sources. According to an embodiment, the apparatus further comprises computer program code configured to, with the at least one processor, cause the apparatus to receive filter information or source selection information from the user for restricting the data from the at least two sources. According to an embodiment, the apparatus further comprises computer program code configured to, with the at least one processor, cause the apparatus to selecting the content for annotation from source content, to filter the selected content to reduce irrelevant and redundant information, and to enhance the cohesion and coherence of the content. According to an embodiment, the apparatus further comprises computer program code configured to, with the at least one processor, cause the apparatus to generate summarization of the content through natural language processing.

According to a third aspect there is provided a computer program product stored on a computer readable medium and executable in a data processing device, wherein the computer program product comprises a computer program code section for obtaining picture description information from a picture source, wherein the picture description information having been formed at least partly automatically, a computer program code section for obtaining annotation information from at least two object sources, wherein the at least two object sources are different from the picture source, a computer program code section for automatically fusing the annotation information from the at least two object sources to form fused annotation information, and a computer program code section for attaching the fused annotation information to the picture to create an object note for the picture.

According to a fourth aspect there is provided a computer program product stored on a computer readable medium and executable in a data processing device, wherein the computer program product comprises computer program code sections for carrying out the method according to embodiments of the first aspect.

According to a fifth aspect there is provided an apparatus comprising means for obtaining picture description information from a picture source, wherein the picture description information having been formed at least partly automatically, means for obtaining annotation information from at least two object sources, wherein the at least two object sources are different from the picture source, means for automatically fusing the annotation information from the at least two object sources to form fused annotation information, and means for attaching the fused annotation information to the picture to create an object note for the picture.

According to a sixth aspect there is provided a network service providing to a user picture description information from a picture source, wherein the picture description information having been formed at least partly automatically, annotation information from at least two object sources, wherein the at least two object sources are different from said picture source, fused annotation information by automatically fusing said annotation information from said at least two object sources, and an object note for said picture by attaching said fused annotation information to said picture.

According to a fifth aspect there is provided a picture signal embodied on a carrier media, the signal comprising picture description information from a picture source, wherein the picture description information having been formed at least partly automatically, annotation information from at least two object sources, wherein the at least two object sources are different from said picture source, fused annotation information by automatically fusing said annotation information from said at least two object sources, and an object note for said picture by attaching said fused annotation information to said picture.

DESCRIPTION OF THE DRAWINGS

In the following, various example embodiments of the invention will be described in more detail with reference to the appended drawings, in which

FIG. 9 illustrates a storage structure of picture contexts in a context database according to an example embodiment;

FIG. 10 illustrates a clustering table for information on events and persons according to an example embodiment;

DESCRIPTION OF EXAMPLE EMBODIMENTS

Figure 1:
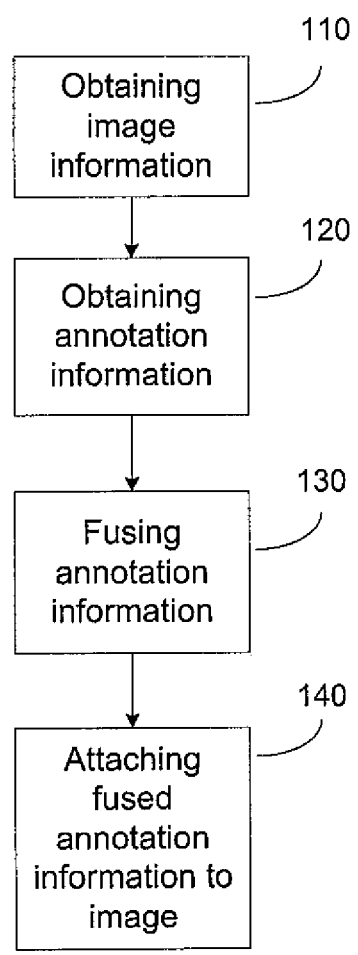
FIG. 1 shows a method for annotating pictures according to an example embodiment.

In the following, several embodiments of the invention will be described in the context of an image (photo) management system on a device or in the network. It is to be noted, however, that the invention is not limited to image management on a single device or in a single service, or even images such as digital photographs or videos. In fact, the different embodiments have applications widely in any environment where management of user-centric data of different modalities is needed.

Nowadays, more and more people use camera or a camera phone to record their daily life. Many digital objects are generated or utilized when people engage in a certain activity. These digital objects may include pictures and videos taken with a camera, calendar entries, short messages (SMS) or multimedia messages (MMS), instant messaging (IM) and chat, social network services like Twitter and Facebook, emails, contact cards, blog entries, audio recordings, music, books, papers and many more. Here, it has been noticed that such data items are not independent, but instead a combination of them usually conveys a common theme. Finding the relevant objects when browsing a photo is not, available in existing photo browsing applications. It has also been realized here that it may be beneficial and appreciated by users to get an overview of the activity that the photo or video records when browsing the photo or video later.

In the example embodiments, there are presented mechanisms and systems for automatically constructing linkage between an object such as an image or video and related objects with relevant contexts, and more specifically for generating object abstraction by integrating and summarizing pieces of the context information extracted from the linked objects. First, the relevant objects of a specific object are found by computing a multidimensional object contexts similarity measure. Then, a hyper object note is created by abstracting object summarization from the relevant objects. Such an approach may offer advantages, for example, most relevant content concerning an object may be found automatically through association analysis of contexts essentially without user intervention, and the most important context information may be extracted to summarize and integrate an object abstraction to give user the most meaningful information at the first sight of the object.

The relevant objects to a specific object may be found and ranked by cross-object correlation computing. A hyper-object-note may be abstracted as an object summarization from the relevant objects found. The generation of the hyper object note may be done through the following mechanisms. The most relevant and the most representative objects may be directly used as object notes, for example, by using top-1 relevant objects such as email, SMS or other messages, calendar entry, contact card, blog entry, Wiki page, in the annotation. Natural Language Processing (NLP) may be used to abstract a text note from the relevant objects.

FIG. 1 shows a method for annotating images according to an example embodiment. First, in step 110, image or photo description information is obtained for an image (or video) from an image or photo source such as a camera, a collection of images in memory or a photo album. The image or photo description information may have been formed at least partly automatically for example by adding a time, location (Global Positioning System or GPS coordinates) and user information to the image. In step 120, annotation information from different sources is obtained, for example by retrieving email, SMS and multimedia messages and calendar and contact information. These may be different from the image source and they may have at least partly different internal representation of information. The use of different sources of information may make the hyper-object-note richer and more natural. In step 130, the obtained annotation information from the different sources is fused form the hyper-object-note. The hyper-object-note may contain text, images, sound, and different objects and it may contain links to the source objects or objects related to the source. In step 140, the hyper-object-note is then attached to the image or photo to get an image with a hyper-object-note. This attaching may happen in various ways, e.g. by embedding the information into the image file, by constructing a new file where the image file and the hyper-object-note reside, by forming metadata that links the image and the hyper-object-note information, by linking the image and the hyper-object-note by file naming and so on. It needs to be appreciated here that in addition to pictures or photos, hyper-object-notes may relate to different kinds of data objects including various media objects like audio, video, music, books, papers and any other useful objects.

Figure 2A:
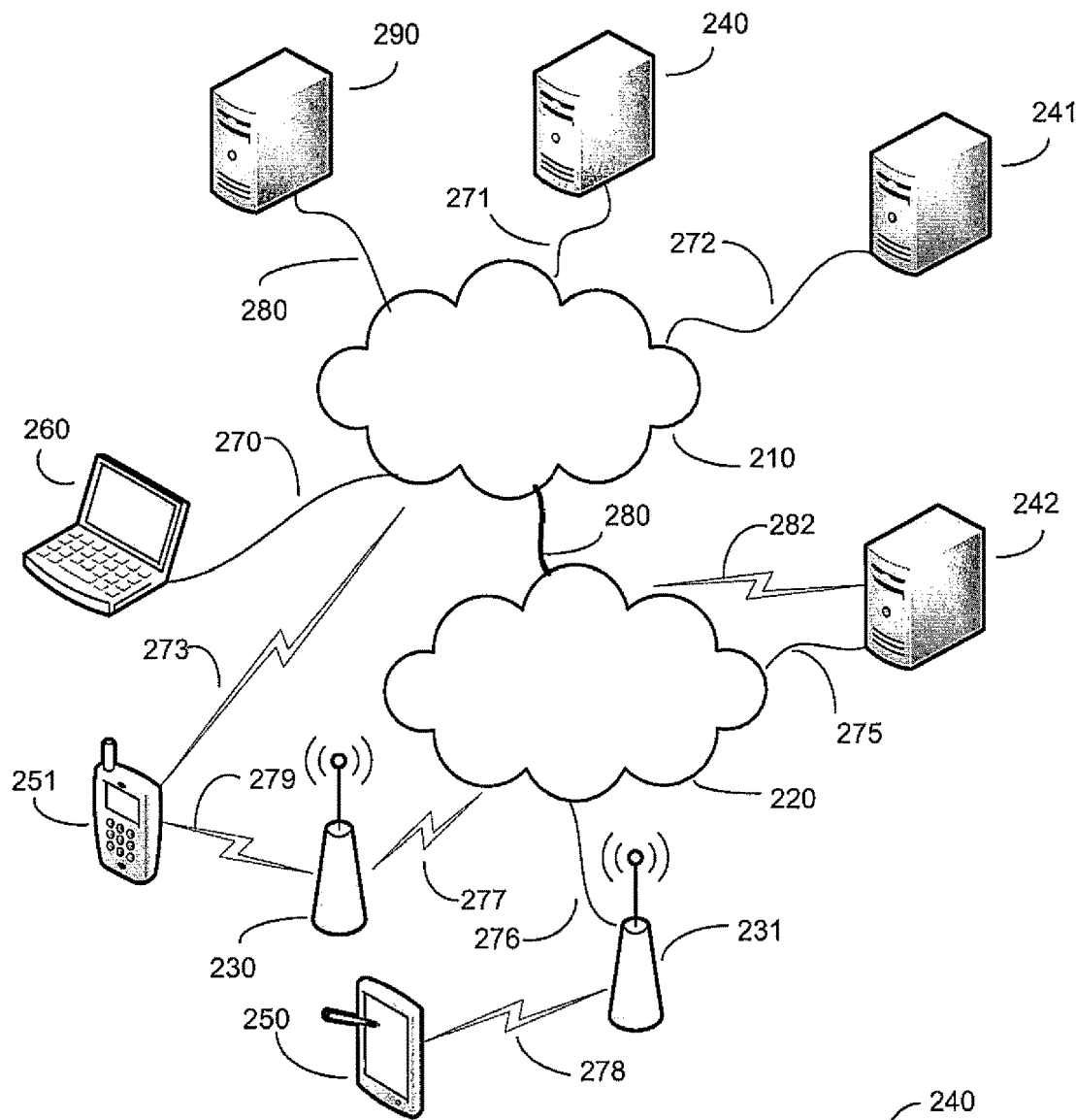
FIGS. 2a and 2b show a system and devices for annotating pictures according to an example embodiment.

FIG. 2a displays a setup of devices, servers and networks that contain elements for annotating images residing on one or more devices. The different devices are connected via a fixed network 210 such as the internet or a local area network, or a mobile communication network 220 such as the Global System for Mobile communications (GSM) network, $3^{rd}$ Generation (3G) network, $3.5^{th}$ Generation (3.5G) network, $4^{th}$ Generation (4G) network, Wireless Local Area Network (WLAN), Bluetooth, or other contemporary and future networks. The different networks are connected to each other by means of a communication interface 280. The networks comprise network elements such as routers and switches to handle data (not shown), and communication interfaces such as the base stations 230 and 231 in order for providing access for the different devices to the network, and the base stations are themselves connected to the mobile network via a fixed connection 276 or a wireless connection 277.

There are a number of servers connected to the network, and here are shown a server 240 for creating a hyper-object-note for an image or a photo and connected to the fixed network 210, a server 241 for storing image data and connected to either the fixed network 210 or the mobile network 220 and a server 242 for creating a hyper-object-note for an image or a photo and connected to the mobile network 220. There are also a number of computing devices 290 connected to the networks 210 and/or 220 that are there for storing data and providing access to the data via e.g. a web server interface or data storage interface or such. These devices are e.g. the computers 290 that make up the internet with the communication elements residing in 210.

There are also a number of end-user devices such as mobile phones and smart phones 251, internet access devices (internet tablets) 250 and personal computers 260 of various sizes and formats. These devices 250, 251 and 260 can also be made of multiple parts. The various devices are connected to the networks 210 and 220 via communication connections such as a fixed connection 270, 271, 272 and 280 to the internet, a wireless connection 273 to the Internet, a fixed connection 275 to the mobile network, and a wireless connection 278, 279 and 282 to the mobile network. The connections 271-282 are implemented by means of communication interfaces at the respective ends of the communication connection.

Figure 2B:
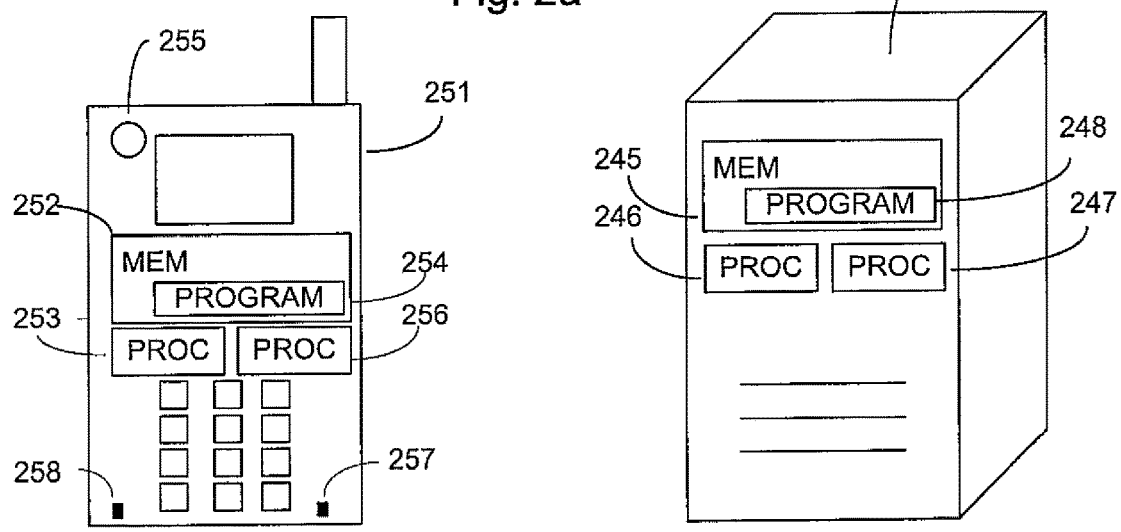

As shown in FIG. 2b, the server 240 contains memory 245, one or more processors 246, 247, and computer program code 248 residing in the memory 245 for implementing annotation functionality. The different servers 241, 242, 290 contain at least these same elements for employing functionality relevant to each server. Similarly, the end-user device 251 contains memory 252, at least one processor 253 and 256, and computer program code 254 residing in the memory 252 for implementing the annotation functionality. The end-user device may also have at least one camera 255 for taking pictures. The end-user device may also contain one, two or more microphones 257 and 258 for capturing sound. The different end-user devices 250, 260 may contain at least these same elements for employing functionality relevant to each device. Some end-user devices may be equipped with a digital camera enabling taking digital pictures, and one or more microphones enabling audio recording during, before, or after taking a picture or a photo. From the above, it is clear that the servers and the end-user devices comprise means for obtaining information from various sources, such as memory means, bus or other internal data connection means, or wired and/or wireless network connections for obtaining information from external sources. The devices and servers also contain means for processing the information such as memory, circuitry and processors. These means may be electric or optical or other suitable means.

It needs to be understood that different embodiments allow different parts to be carried out in different elements. For example, the creation of the hyper-object-note for an image or a photo may be carried out entirely in one user device like 250, 251 or 260, or the image annotation may be entirely carried out in one server device 240, 241, 242 or 290, or the creation of the hyper-object-note for an image or a photo may be carried out across multiple user devices 250, 251, 260 or across multiple network devices 240, 241, 242, 290, or across user devices 250, 251, 260 and network devices 240, 241, 242, 290. The creation of the hyper-object-note for an image or a photo can be implemented as a software component residing on one device or distributed across several devices, as mentioned above. The creation of the hyper-object-note for an image or a photo may also be a service where the user accesses the service through an interface e.g. using a browser.

Figure 3:
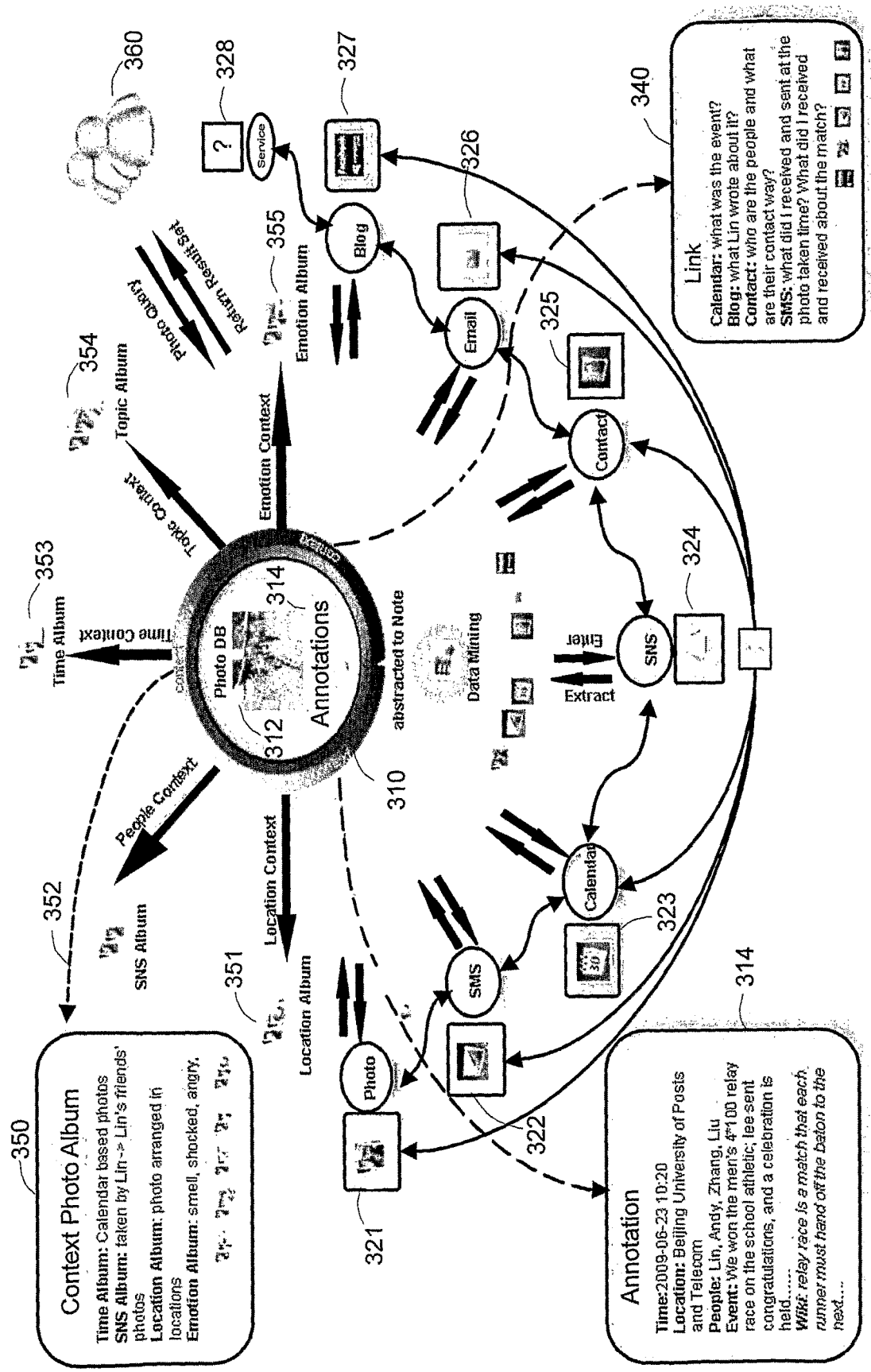
FIG. 3 shows an overview of an example arrangement for annotating pictures.

FIG. 3 shows an overview of an example arrangement for creating a smart note (hyper-object-note) for pictures. In the arrangement, photo or a picture is a rich context contained object 310 comprising a picture 312 and associated hyper-object-notes 314. The contexts of a picture 321 may describe different attributes, such as time information, location information, event information, emotions of people, content information (metadata), environment circumstances like temperature and humidity, equipment parameters and so on. These contexts may exist not only in photos 321, but also in other objects, such as short messages or other messages like multimedia messages (MMS) or instant messages 322, calendar entries 323, social network systems 324, contact cards 325, email messages 326, blog entries 327 and others, e.g. different internet services 328 like search engines, digital books and papers, music, audio recordings and the like. An association link 340 between the different objects may therefore be established between the picture and other objects based on common contexts to create a hyper-object-link. Based on the contexts, pictures can be clustered into different albums 350 to manage user photos, such as a location album 351 arranged by location, an SNS album 352 based on social contexts, a time album 353 arranged by time, a topic album 354 grouped by topic, and an emotion album 355 based on detected emotions. Such albums may be called multidimensional photo albums 350. It is also possible to perform a picture query from an external source 360, e.g. from other people's photo albums, to associate pictures from these albums to the picture 310 being annotated.

The process of establishing the hyper-object-link 340 between photo 312, 321 and other objects may operate as follows. Since the photo and other objects share common contexts, there is a natural relationship between them. First, contexts of photo are collected from various resources. For example, the time the picture was taken, the camera model, the photographing parameters and other such information may be extracted from EXIF information (Exchangeable Image File Format information) which is attached with the image file; GPS coordinates may be collected from an internal source through an application programming interface (API); humidity, temperature and noise grade may be collected from sensor data external or internal to the device. The collected contexts constitute the raw data. Context modelling and data mining allows the relations between photo and other objects hidden in these collected raw data to be revealed. With the result of these operations, the association between photo and relevant objects may be established essentially automatically or with little help from the user to create hyper-object-link. The related objects may be interconnected through context relations in the described photo-centric mode. It needs to be understood that other media such as video, sound and others may be used in place and in addition to pictures or photos.

The forming of the links and the creation of the object note (hyper-object-note) may happen on a single device, or on a plurality of devices. The forming may happen as a network service provided by a service provider at least one network address. The user may access the network service e.g. to browse, organize and search for pictures. The service may then provide means for linking different objects to the picture as described earlier and later in this text. The service may then allow and enable the creation of a hyper-object-note. These functions of the service may provide the user with a picture signal that can be embodied on a computer readable medium, where the picture signal contains links to different objects and/or summarization of different objects. This data attached to the picture signal may have been created by fusing information from various objects and by creating a hyper-object-note.

Figure 4:
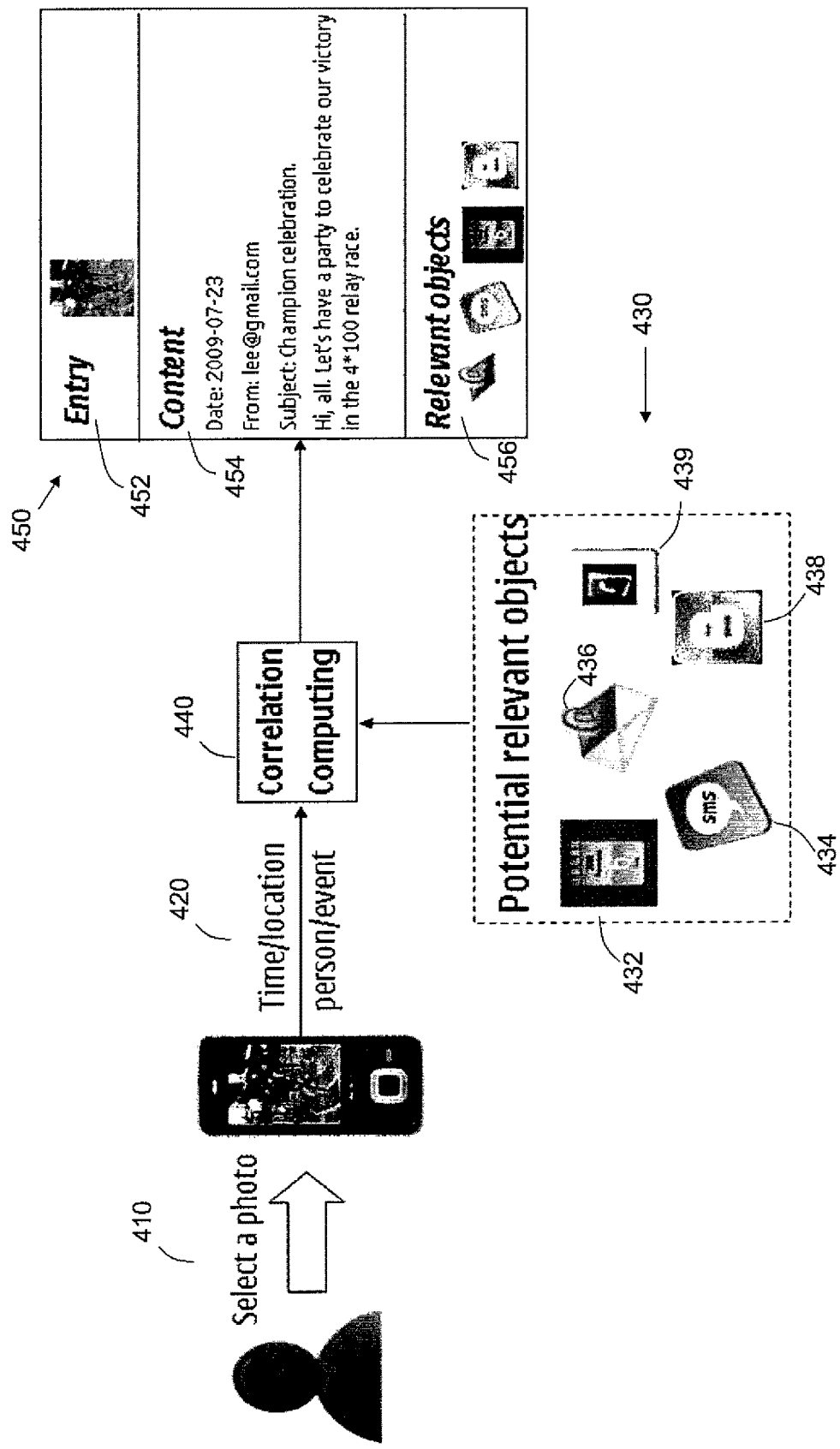
FIG. 4 illustrates a way for linking information from relevant objects to a picture according to an example embodiment.

FIG. 4 illustrates a way for linking information from relevant objects to a picture according to an example embodiment to create hyper-object-link. The user selects 410 a photo stored in the mobile phone, and takes it as a query entry to submit to the system. After collecting the context data 420 embedded in the image file or extracted from an internal API or external sensor data, the system begins to model these raw data and does data mining to find the potential relationship between photo and other related objects 430 like calendar notes 432, SMS messages or other messages like multimedia messages or instant messages 434, email messages 436, blogs 438 and social media services and the phone book (contact cards) 439. After that, a linkage graph is built by correlation computing 440. Two linkage modes may be provided based on this linkage graph. In the simple mode, a background program computes the correlation coefficient (score) of the related objects and may also rank them with a score automatically. This may result in top-N, e.g. top-3, object contents with highest score to be arranged in the result bar 456, and a user may select a related object to acquire detailed information. Such an approach may allow to create a summary or to otherwise show the content 454 of the objects in relation to the picture 452 in order to form a hyper-object-note 450, Compared with the simple mode, in an interactive mode the user can add his own constraint conditions to limit the link scope or to raise the degree of association. As shown in FIG. 4 by way of example, a user selects a photo to the system; the photo is about a relay race. After computing, the system finds four most relevant objects to this photo (email, SMS, calendar, blog). If the user wants to find relevant objects according to his own desire, he could add restrictions. Here, for example if user adds restriction of "relay race, champion, celebration" to the system, less than four most relevant objects may be presented. Clicking the icon of email, user could enter the email program to see the detail of the mail which is about celebration of the relay race champion.

Figure 5:
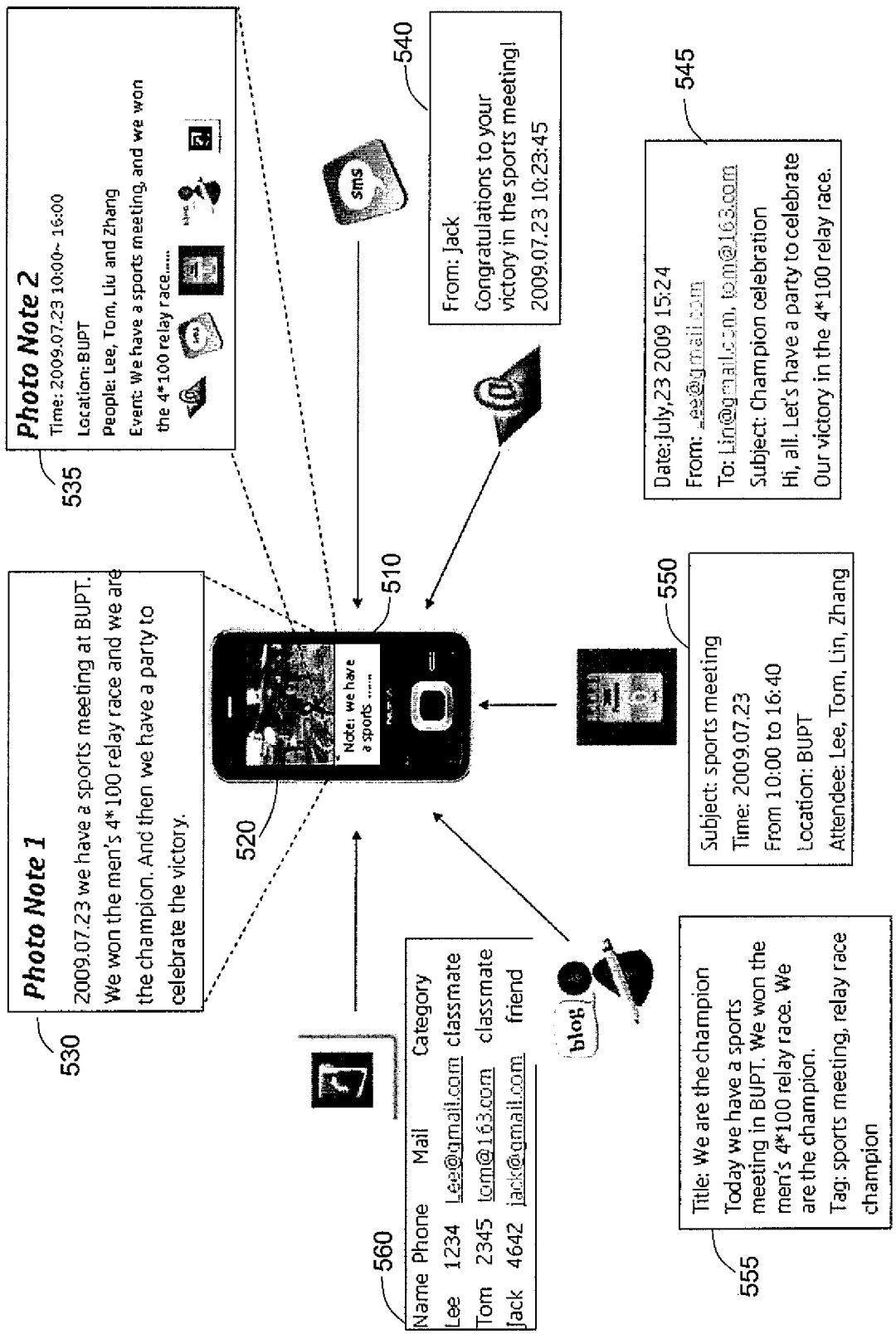
FIG. 5 illustrates a way for forming an annotation for a picture using relevant objects according to an example embodiment.

FIG. 5 illustrates a way for forming a hyper-object-note for a picture or a photo using relevant objects according to an example embodiment. The illustration happens in the following through a practical example. Lin is a student of Beijing University of Posts and Telecommunications, and he likes athletics very much. A sports meeting will be held in his university on Jul. 23, 2009. Lin and his classmates Lee, Zhang and Tom will take part in the men's 4*100 meters relay race; Lee, Zhang and Tom may have entries in the phone book 560, as well as a friend Jack. Lin is looking forward the competition and he adds an event 550 on his mobile phone 510 to record this event and remind himself to get plenty of exercise for the match. On the race day, at 10:00 am Lin and his partners stood at the starting line. Lin ran the first leg of the relay, and he ran very fast. Andy ran the second leg, Zhang ran the third leg and Lee ran the anchor leg. At the anchor leg, they already had a big lead against overmatched teams. At the finishing line, Lin took a photo 520 with Lee, he wanted to record the emotional moment with his camera phone. At last they won the race. They all felt very happy; at 10:23 Lin received a greeting message 540 from his friend Jack, which said "Congratulations to your victory in the sports meeting!" After the match, Lin uploaded this photo from his mobile phone to server; he wanted to share his happiness with his friends and classmates. That afternoon, Lin updated his blog 555 by writing "we won the men's 4*100 relay race on the school athletic" at the same moment, Lin received an email 545 from his partner Lee, which said that there would be a party for celebration that night.

From the story, we can see that information about the match are recorded in various types of objects, such as calendar, photo, email, short message (SMS), multimedia message (MMS), blog and the detail introduction about relay race can also be found on Wikipedia or other wiki. These objects contain records about the match, and making a summarization of these seemingly unrelated objects, the user may be offered a cross-object panoramic view of the activity and the user may more easily be able to recall detailed information about that match. By analyzing the EXIF information, the taken time is extracted first; through this, the photo may be linked to the calendar and the subject, time interval, attendees and location may be found. Through the subject and time interval, the SMS and emails with the relevant subject or time are linked to the photo.

Here are provided two styles of picture annotations, a comprehension based hyper-object-note 530 and an extraction based hyper-object-note 535. The comprehension based hyper-object-note is more like a short essay, and the extraction based hyper-object-note is more like a catalogue listing the key contents and providing links to them. In the hyper-object-note, there may thus be text and icons of objects and/or links to objects that the user can activate to reach the actual objects. The two hyper-object-note styles may be also mixed and combined, and other styles may be added. Later, browsing this photo, a user could get a short summary at the first sight to help user grasp as much information as possible in a short time.

Figure 6:
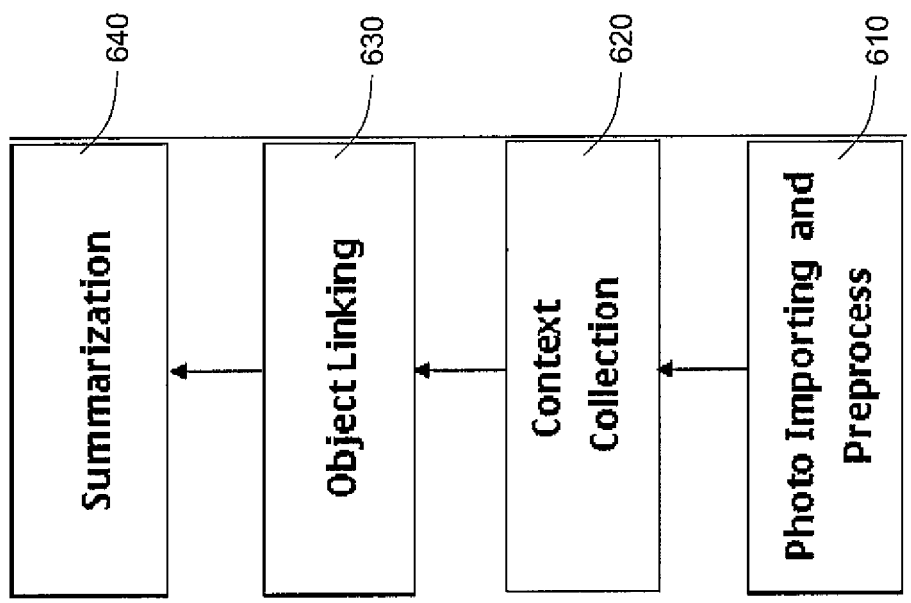
FIG. 6 shows a method for annotating pictures according to an example embodiment.

FIG. 6 shows a method for annotating pictures according to an example embodiment. There may be e.g. four steps in the whole process. First, in "photo importing and pre-process" 610, photos from local file system and/or external sources like a photo service, external computers or such are imported, and the photo time and location information, for example Global Positioning System (GPS) coordinates, are determined from EXIF data. The pictures or photos may also be clustered based on density distribution of time and GPS coordinates. Second, in "context collection" 620, explicit contexts, such as the time when the picture was taken, GPS, location name, etc. are automatically collected for annotation—on the other hand, event subjects and persons involved may be tagged for the annotation through recommendation and user interaction. Third, in "object linking" 630, photo and non-photo objects are linked based on correlation of multiple contexts. The correlation computing is based on similarity of contexts of time, location, persons, and event, and so on. Fourth, in "summarization" 640, summary information is generated for the annotation from the linked objects.

FIG. 5 illustrates an architecture for noting pictures according to an example embodiment to create hyper-object-notes. From bottom to top, the first layer may be called "photo importing and pre-process layer" 710, where the tasks are to import photos 712 from file systems and extract the taken time and position (GPS) data from EXIF parsing 714, possibly with GPS to location conversion 720. Then, the photos may be clustered 718 into small clusters based on time and GPS coordinates. Photos with similar time stamp and GPS coordinates may be mostly related with the same event and attendee, so after pre-clustering it may be possible to recur to the cluster's annotation repository to recommend annotations to other photos. The results of the first layer may be stored to a context database 716.

The second layer may be called "Context Collection layer" 730. Time and location context may not be sufficient to provide cross-object links, and a more semantic context is collected on this layer. In this layer, information from different related sources (as explained before) such as calendar 732 may be used. The information is extracted in 734 and associated in 736 with the photo, and user identities may also be determined for this purpose in 738. The layer may create so-called semi-annotation for the picture.

The third layer may be called "Correlation Linking layer" 750. In addition to the photo 752, information from different sources such as email 754, calendar entries 756 and contact information 758 may be used. Email 754, calendar entries 756 and contact information 758 may be indexed in 755, 757 and 759, respectively, and provided as input to a search 760. Through multiple context similarity computing in 764, the correlation between entry object and other potential objects are quantified. By ranking the correlation score, most relevant objects may be selected. The results may be stored in a result database 768.

The fourth layer may be called "Summarization layer" 770. On this layer, summarizations from the already found relevant objects may be automatically generated. The photo 772 (which may be the same photo as 752) and the result of the correlation linking 768 may be used as a source when the relevant documents are retrieved in 774. From the data, email 778, calendar entries 776 and contact information 780, as well as other information 782 may be selected at least partially in 784. Through content filtering in 786, and summarization in 788 a hyper-object-note for the photo is created. The implementation details of the different layer are described in the following.

Figure 7:
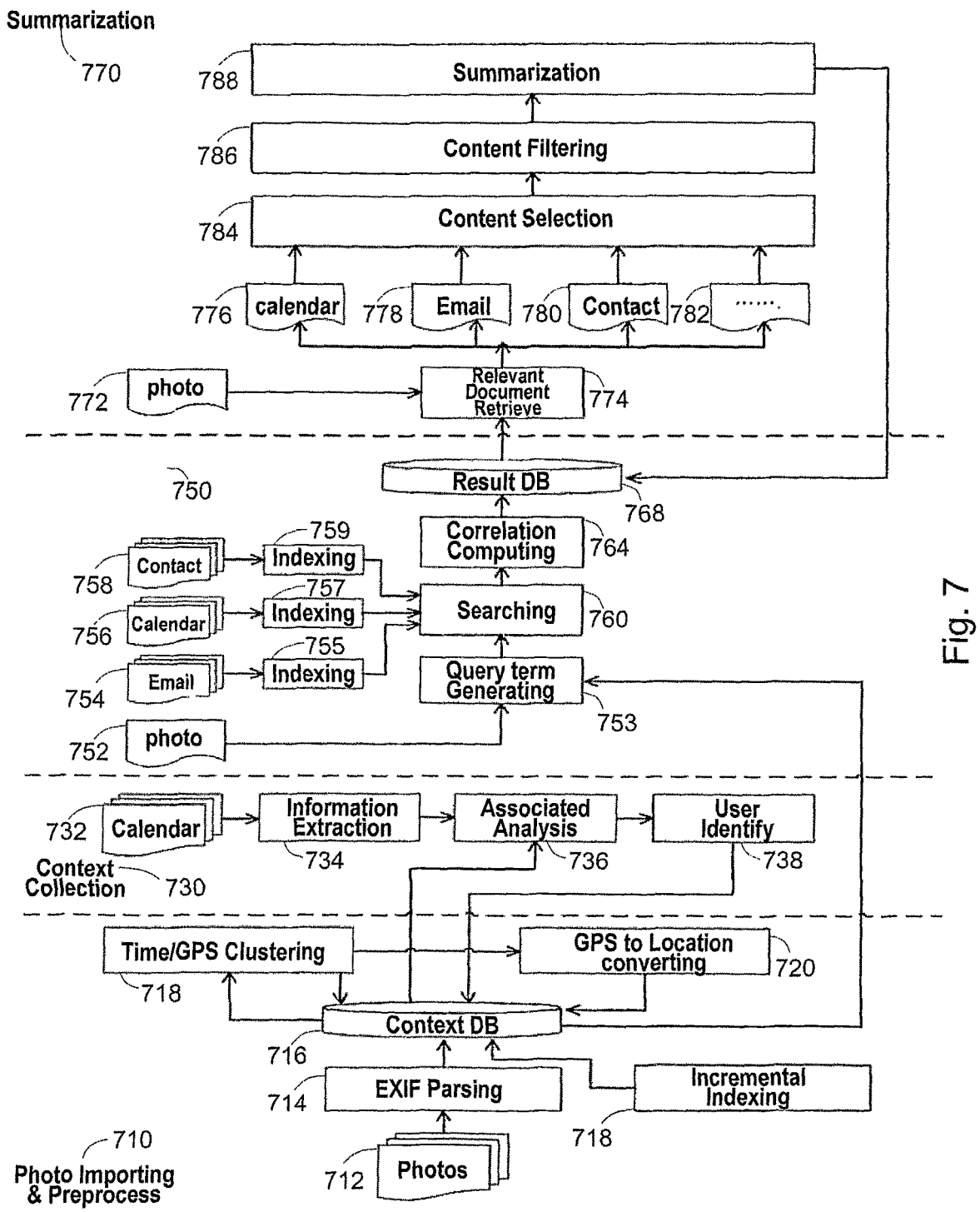
FIG. 7 illustrates an architecture for annotating pictures according to an example embodiment.
Figure 8:
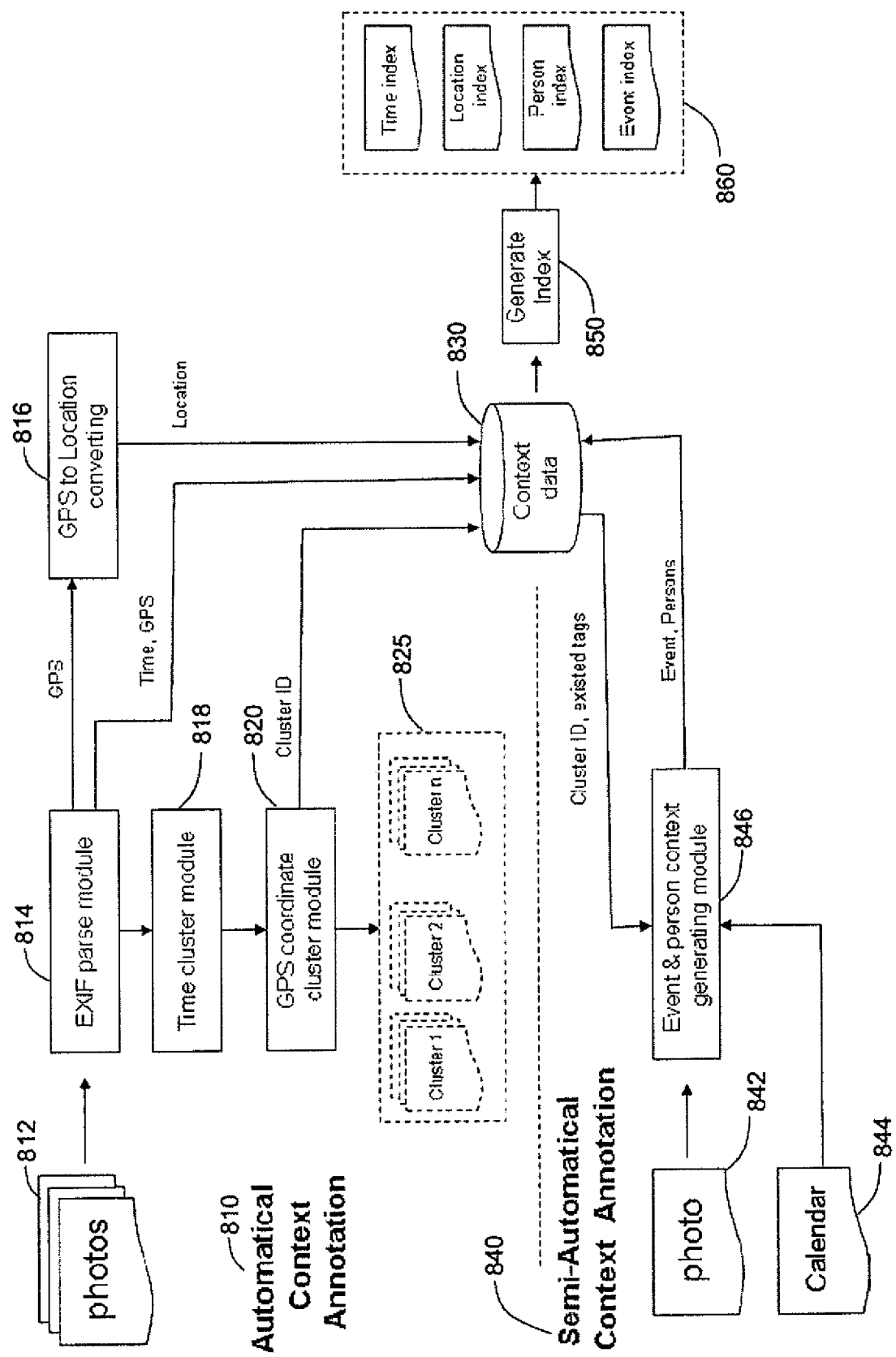
FIG. 8 shows an architecture for context collection according to an example embodiment.

FIG. 8 illustrates the process of context collection in the second layer of FIG. 7 according to an example embodiment. There are at least three methods to collect contexts. A first method is automatic context annotation 810. Currently many camera devices can write time and GPS information into a photo 812 into the EXIF data structure that can then be parsed to extract this information in 814. GPS can also be translated to text location through position-location name mapping, e.g. by software in 816. The time and location contexts may be clustered in 818 and 820 to yield different context clusters 825. The extracted and processed information can then be stored in to context data store 830. The store 830 may be indexed in 850 to have time, location, person and event indexes 860 for fast searching.

The context annotations may also be generated semi-automatically 840. For example, user may add event information to his calendar 844. The event is possibly related to photo 842 due to proximity in time. The event can then be extracted in 846 and recommend to the user, and the user may judge whether it's related to the photo. If user confirms the event, then the event may be added as hyper-object-note to the photo.

The context annotations may also be created manually. For example, the user can annotate the person in the photo by writing down the person's name. The photo's environment may be annotated by hand and emotion may be tagged e.g. with the help of smilies or other icons or text descriptions of the current emotion, or by other tags. After getting position (GPS) and time context, we also cluster the photos by GPS coordinates and time context, and the annotations of a certain cluster may be recommended to user to annotate other photos which belong to the same cluster.

FIG. 9 illustrates a storage structure of picture contexts in a context database according to an example embodiment. A photo context record may include photo-id 920 to identify the photo, a date 922 and time 924 when the photo was taken, a GPS position 926, a location 928 possibly generated from the position, persons related to the photo 930, event information 932, and one or more cluster ids 934 where the photo belongs. Different context records 910, 912, 914 and 916 may have completely different field values, or some of the field values may be the same, and realized as references.

FIG. 10 illustrates a clustering table for information on events and persons according to an example embodiment. The event clustering table may have, for example, the following fields for the records 1010, 1012, 1014: cluster id 1020 to identify the cluster, event description 1022 and event count 1024. The event count 1024 indicates how many times the event id is used to annotate a photo in this cluster, that is, it can be used to determine how many photos belong to this event cluster. The person clustering table may include the following fields for the records 1030, 1032 and 1034: the cluster id 1040, person name 1042 and person count 1044. The person name field 1042 may contain one or more names or other tags descriptive of persons, and the person count indicates the number of photos in the cluster.

Figures 11A, 11B:
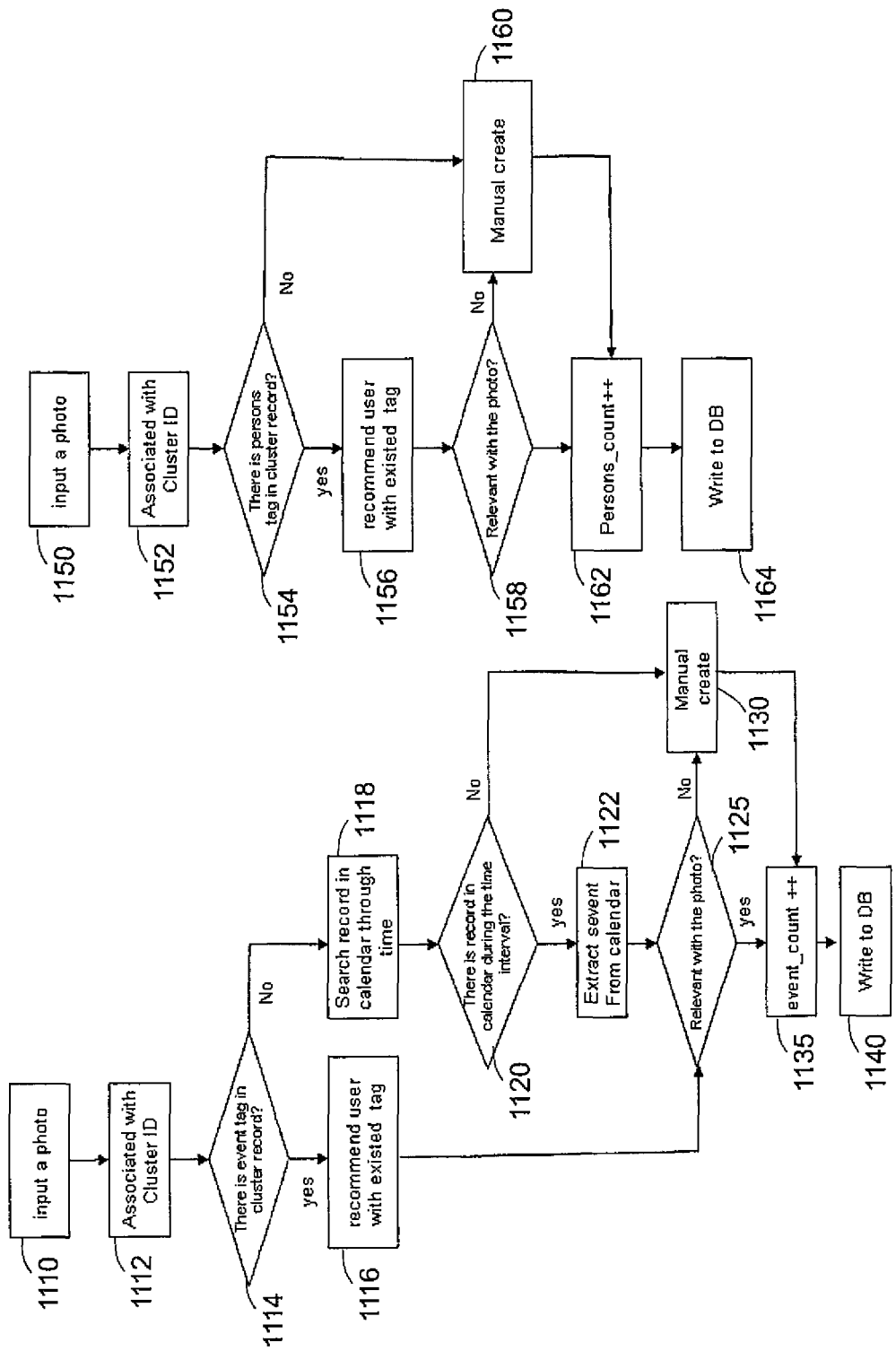
FIGS. 11a and 11b show flow charts of collecting event context and person context according to an example embodiment.

FIGS. 11a and 11b show flow charts of collecting event context and person context according to an example embodiment. In FIG. 11a, event context collection is shown. In step 1110, a photo is input to the process. Then, it is judged which clusters the photo belongs to and a cluster id for the photo is allocated in 1112. The clusters have been previously clustered by GPS and time context. In 1114, it is determined whether there already is an event tag in the cluster. If a tag exists, the event tag may be recommended to the user in 1116. If the event tag is related to the photo and user accepts the event tag in 1125, then event count is incremented 1135, as described for FIG. 10. If an event tag is not found in the cluster, the user may create a new event tag manually or one may be created automatically in 1118. If there is no an event tag in the cluster, a calendar event with the proper time range is searched in 1118. If there is an event in the calendar matching the time duration 1120, then the event is extracted 1122 from the calendar and recommended to the user, and the user may accept the recommendation in 1125. If there is no event with a proper range in the calendar, then a new event may be created manually by the user in 1130. Finally, the results may be added to the cluster table in 1140.

In FIG. 11b, person context collection is shown. First, a photo is input in 1150. Then, a cluster id is allocated for the photo in 1152. Next, it is determined whether there are any person tags in the cluster record in 1154. If there are person tags in cluster record, then the person tags may be recommended to user in 1156. If the person tags are related to the photo and user accepts the person tags in 1158, then person count is incremented 1162 and written into a database in 1164. If the person tags are not related to the photo, user can create person tags manually in 1160 and the person count is incremented.

Figure 12:
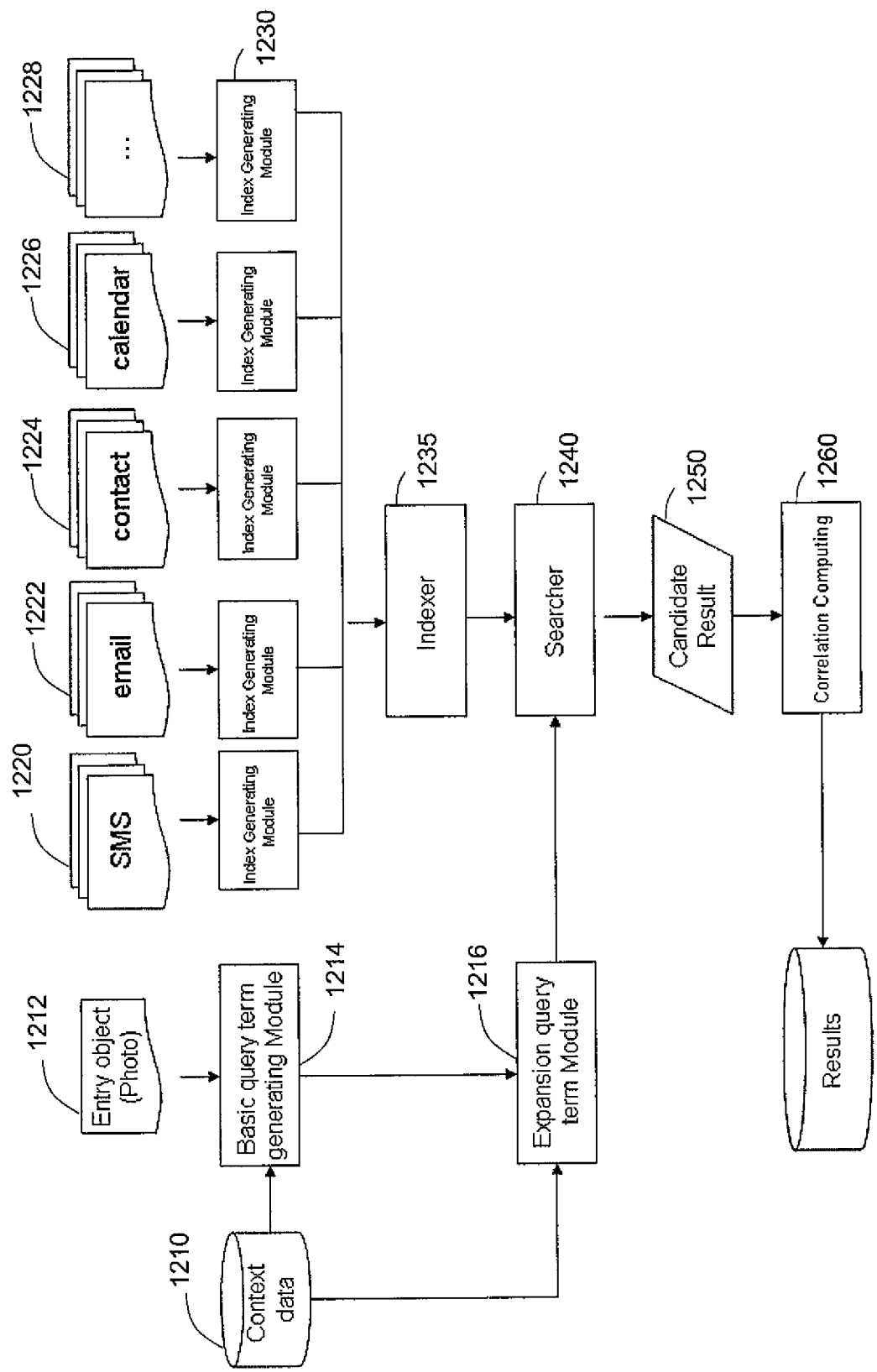
FIG. 12 shows a process for correlation based linking of objects to a picture according to an example embodiment.

FIG. 12 shows a process for correlation based linking of objects to a picture according to an example embodiment on the third layer of the system architecture. First, an entry object (picture/photo) 1212 is submitted to the system. A query is then generated in 1214 to select the metadata of the object as the basic query term from the context database 1210. Based on the cluster id, expansion query terms may also be selected in 1216 from the cluster the photo belongs to. On the other hand, different types of objects are indexed separately beforehand in 1230 and 1235. These objects include SMSs 1220, emails 1222, contacts 1224, calendar entries 1226 and others 1228 like MMSs, instant messages, social network posts, blog entries and such. With the basic and expansion query term as query constraint condition, candidate results 1250 are searched from the potential relevant objects in 1240. Then, the correlation computing module 1260 computes and ranks the correlation degree between the entry object and the candidate objects through multi-context similarity computing. Finally, the top N most relevant objects are selected and stored in a database.

A part of creating the hyper-object-link between objects is multi-dimensional context correlation computing. In order to measure the correlation degree between different objects, the concept of activity theme is defined. The main concept of an activity theme that a photo records can be abstracted to four key dimensions:

time/location/person/event. Using weighed sum of similarity of the four dimensions the correlation between a photo and non-photo objects is computed as $$Sim=sim_{time}+sim_{location}+sim_{person}+sim_{event}$$

Photos are clustered into clusters, using contexts tags contained in other photos which belong to the same cluster with the current linking photo to supplement the query condition.

In the following, correlation computing between photo and email is introduced.

Time correlation may be determined as follows. The similarity in time dimension between email and photo is calculated in two aspects: time distance and textual coexistence.

$$Sim_{time}=\alpha_{time}*f(tag_{time},time_{email})+\beta_{time}*L(tag_{time})$$

Above, the function $f(tag_{time},time_{email})$ measures the time distance of the photo's capture time and the email's send/receive time. In most circumstances, a mail's topic may be relevant to the activity which the photo records only if the time interval between the photo's taken time and email's send/receive time is no more than 5 days:

$$f(tag_{time}, time_{email}) = \begin{cases} 1, & (|tag_{time} - time_{email}| \leq 5 \text{ days}) \\ 0.5, & (5 \text{ days} \leq |tag_{time} - time_{email}| \leq 10 \text{ days}) \\ 0, & (|tag_{time} - time_{email}| \geq 10 \text{ days}) \end{cases}$$

Here the function $L(tag_{time})$ measures the similarity between photo and email in textual coexistence. If time information is explicitly recorded in the email's subject part or body part, and the time is between the begin time and end time of the activity that the photo records, it can be deduced that the email may have a strong relation with the photo:

$$L(tag_{time}) = \begin{cases} 1, & (g(tag_{time}) \subset \text{mail}) \\ 0, & (g(tag_{time}) \not\subset \text{mail}) \end{cases}$$

The purpose of $g(tag_{time})$ is to convert the form at of time to corresponding type compatible to the mail.

Person correlation may be determined as follows. An email and photo are related if they refer to the same persons. Regularly, person's information appears in the email's sender/receiver field; in some cases, the persons' name also appears in the mail's body part. So, we calculate the correlation in such an approach:

$$Sim_{person} = \alpha_{person} * L_{head}(f(tag_{person})) + \beta_{person} * L_{head}(f(tag_{person\_extend})) + \chi_{person} * L_{body}(tag_{person} + tag_{person\_extend})$$

Above, $tag_{person}$ refers to the persons' name that is annotated as the tag for the current photo, and $tag_{person\_extend}$ refers to the persons' name that is annotated as the tags for the photos which belong to the same cluster with the current photo. The function $f(tag_{person})$ and $f(tag_{person\_extend})$ translates the person's name to email address.

If the tag of person name appears in the sender or receiver's field, it can be deduced that the mail may have strong relation to the photo; also if the people's names which are annotated in other photos which belong to the same cluster with the current photo, the email also has some relation to the theme:

$$L_{body} = \begin{cases} 1, & (tag_{person} \subset \text{mail body OR } tag_{person\_extend} \subset \text{mail body}) \\ 0, & (tag_{person} \not\subset \text{mail body AND } tag_{person\_extend} \not\subset \text{mail body}) \end{cases}$$

The fact that people may write the persons' names in the email body part when they need to inform them of some details, provides another approach to compute the correlation:

$$L_{head} = \begin{cases} 1, & \begin{pmatrix} tag_{person} \subset (\text{sender field OR receiver field}) \text{ OR} \\ tag_{person\_extend} \subset (\text{sender field OR receiver field}) \end{pmatrix} \\ 0.5, & \begin{pmatrix} tag_{person} \not\subset (\text{sender field AND receiver field}) \text{ AND} \\ tag_{person\_extend} \not\subset (\text{sender field AND receiver field}) \end{pmatrix} \\ 0, & \text{other} \end{cases}$$

Location correlation may be determined as follows. If the location name appears in the email body, the correlation may exist:

$$Sim_{location} = L_{body}(tag_{location})$$

The definition of $L_{body}$ is as the same as the preceding one in the approach of person correlation computing.

Event correlation may be determined as follows. Vector Space Model (VSM) may be used to compute the correlation between the events tag and the emails in event dimension using a so-called TF-IDF (term frequency-inverse document frequency) model.

Suppose there are $|D|$ mails in the phone, and we use vector $\vec{v}_{mail}$ to record the weight of each term appears in the mails, and use vector $\vec{v}_{event}$ to record the weight of the annotated event tag and extended event tag.

$$\vec{v}_{mail} = \{w_{i,j}\} (1 \leq i \leq N, 1 \leq j \leq |D|)$$

$$\vec{v}_{event} = \{w_{self}, w_2, w_3, \ldots, w_m\}$$

Here $w_{i,j}$ refers to the weight of the $i_{th}$ term in $j_{th}$ mail, and $w_{self}$ refers to the weight of the event tag of the current photo itself, and $w_k$ ($2 \leq k \leq m$) refers to the weight of the $k_{th}$ event tag of the photos which belong to the same cluster with the current selected photo.

$$w_{i,j} = tf_{i,j} * idf_i, \quad tf_{i,j} = \frac{n_{i,j}}{\sum_k n_{k,j}}, \quad idf_i = \log\frac{|D|}{1 + |\{d:t_i \in d\}|}$$

$$tf_{i,j} = \frac{n_{i,j}}{\sum_k n_{k,j}}$$

refers to the term frequency. $n_{i,j}$ stands for the number of times the term occurs in the $j_{th}$ mail. The higher the value of the $tf_{i,j}$, the more important the term is.

The formula $$idf_i = \log\frac{|D|}{1 + |\{d:t_i \in d\}|}$$

denotes the inverse document frequency. $|D|$ stands for the total number of the mails, while $|\{d:t_i \in d\}|$ stands for the number of the mails which include the term $t_i$.

$$Sim_{event} = \frac{\vec{v}_{event} \cdot \vec{v}_{mail}}{|\vec{v}_{event}| \times |\vec{v}_{mail}|}$$

In the following, correlation computing between a photo and an SMS message is described.

Because the character of SMS is somewhat similar to the email, the same correlation computing algorithm as with the email may be used.

$$Sim = Sim_{time} + S_{location} + Sim_{person} + Sim_{event}$$

The definition of $Sim_{time}$, $Sim_{location}$, $Sim_{person}$ and $Sim_{event}$ are all the same with that of email.

In the following, correlation computing between a photo and a calendar entry is described.

Time correlation may be determined as follows. The time information is explicitly recorded in the time field. The time information is extracted and the time distance between the photo's time tag and the time extracted from the calendar is computed. The similarity function is defined as:

$$Sim_{time} = \begin{cases} 1, & (\text{begin time} \leq tag_{time} \leq \text{end time}) \\ 0, & (tag_{time} \leq \text{begin time or } tag_{time} \geq \text{end time}) \end{cases}$$

Location correlation may be determined as follows. In many cases, the location name may be explicitly recorded in the corresponding field in the calendar. The location field is examined, and if the location name matches the location tag of the current photo, it can be deduced that the photo and the calendar event may have some correlation.

$$Sim_{location} = \begin{cases} 1, & tag_{location} \text{ equals location} \\ 0, & tag_{location} \text{ not equals location} \end{cases}$$

Person correlation may be determined as follows. There may be an attendee field in calendar entries to record the persons' names who will attending the activity. A comparison is made to compute the correlation: if the photo's annotated person name exists in the attendee field, a high score is given, and if the person tags of other photos which belong to the same cluster with the current photo exist in the attendee field, a lower score is given; if no person tag of the cluster exists in the field, a zero score is given.

$$Sim_{person} = \begin{cases} 1, & tag_{person} \subset \text{attendee area} \\ 0.5, & tag_{person\_extend} \subset \text{attendee area} \\ 0, & \text{other} \end{cases}$$

Event correlation may be determined as follows. A subject field in the calendar records the event's summary information. A comparison to compute the correlation is made: if the photo's annotated event tag exists in this field, a high score is given, and if the annotated event tags of other photos which belong to the same cluster with the current photo exists in the subject field, a lower score is given; if no event tag of the cluster exist in the field, a zero score is given.

$$Sim_{event} = \begin{cases} 1, & tag_{event} \subset \text{subject area} \\ 0.5, & tag_{event\_extend} \subset \text{subject area} \\ 0, & \text{other} \end{cases}$$

In the following, correlation computing between a photo and a contact is described.

A picture taken of a person has the context of person, which can be used measures the correlation between the photo and a contact card. If the tag "person name" equals to the record that exists in the contact, the two are related.

$$Sim = Sim_{person}$$

$$Sim_{person} = \begin{cases} 1, & tag_{person} \subset \text{contact} \\ 0, & tag_{person} \not\subset \text{contact} \end{cases}$$

Figure 13:
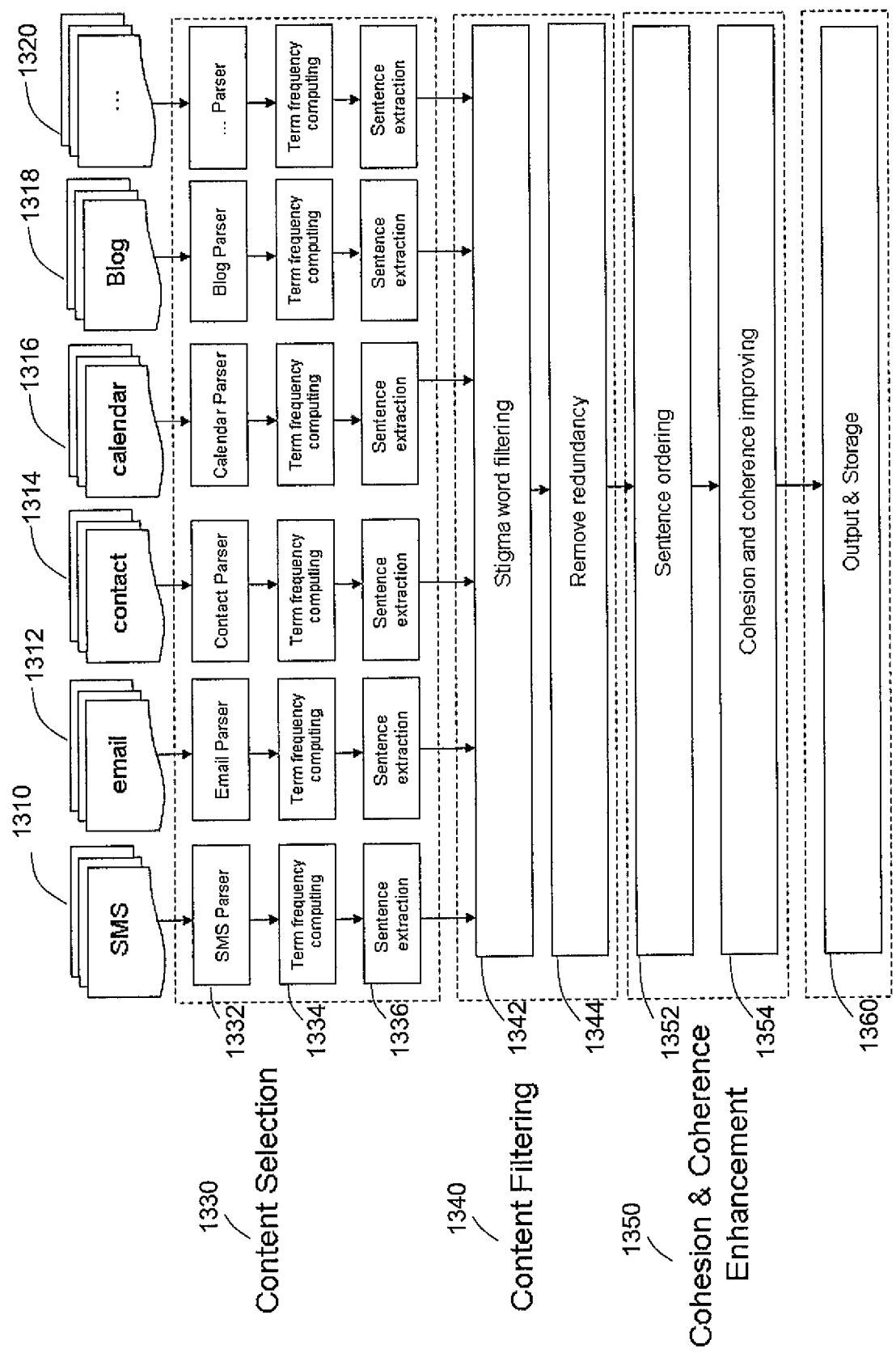
FIG. 13 shows an implementation of forming an annotation for a picture according to an example embodiment.

FIG. 13 shows an implementation of forming a hyper-object-note for a picture according to an example embodiment. The annotation is based on comprehension of the contents that are used as source. From top to bottom, the creation of a hyper-object-note comprises three layers. The first layer may be called "Content Selection" 1330. In this layer, the relevant objects like SMS or MMS messages or instant messages 1310, emails 1312, contact cards 1314, calendar entries 1316, blog entries 1318 and other sources 1320 are first parsed into text format by the parsers 1332. Next, term frequencies in each text file are computed in 1334. Here, TF-IDF model is adopted. Each text file is expressed as a TF-IDF vector (here, the definition and computational process of TF-IDF is as defined earlier in the text). Usually, the importance of a term to a document increases proportionally to the number of the times a term appears in the document, and is offset by the document frequency in the corpus. So we use the arithmetic product of TF (term frequency) and IDF (inverse document frequency) to generate a weight coefficient for each term and then select the top-N terms, which are considered as the most meaningful words in describing the subject content of the relevant objects. We call these selected terms as centroid terms of the relevant objects collections. Based on the centroid terms, sentences which can best convey the common theme are extracted in 1336 through following steps. First, centroid value of each sentence is computed, the key concept is to calculate the weight arithmetic sum of each centroid term contained in the sentence. Then, if the sentence is in the initial or end position, additional score is given. It is because people usually put the most meaningful sentences in the two positions. Third, top-N ranked sentences are selected as the source material to generate the summarization for annotation and hyper-object-note.

The second layer may be called "Content Filtering" 1340. Since the selected sentences may overlap or be similar with each other in lexeme, it may be good to filter them first. "Stigma word filtering" 1342 may remove the redundant words which have little meanings. Since sentences may start with conjunctions like "but", "although", "since" and so on, or verb "say" and its derivatives, or pronouns such as "he", "she", and "they". Sentences with these "stigma words" may lead to discontinuity in summarization, and therefore the score of these sentences is reduced to avoid including them into the summarization. The "remove redundancy" module 1344 aims to remove sentences with repetitive information. Redundancy may occur if two sentences refer to the same subject matter. In order to remove the overlapped sentences, an MMR (Maximum Marginal Relevancy) algorithm to detect the ratio of overlapping is adopted. MMR is a model that scores sentences under consideration as a combination of relevancy and redundancy with sentences already existing in the summary. A sentence will be thrown away if its overlap ratio with the already existing sentences is larger than certain degree, and other sentences will be retained.

The third layer may be called "Cohesion & Coherence Enhancement" 1350. In order to generate a smooth note, the candidate sentences are ordered by e.g. chronological order. Another optional technique is to arrange sentences with topically related themes together to reduce the non-fluency in 1352. Other natural language processing technologies may be involved to improve the cohesion and coherence in 1354. A practical method is to add an introductory sentence for each selected sentence, for example to take the sentence prior to the selected sentence as its introductory sentence. After the third layer, the resulting annotation may be output and stored with the photo in 1360.

Another way to implemented the annotation may be to gather the abstract information of "time/location/person/event" and list the most relevant object for each type of object. The aim is to find the most representative objects to supplement the photo.

The various features of the embodiments may be implemented as a photo-centric cross-object software system for organizing, management, indexing and retrieving objects, as well as automatically generating summarization from multiple sources such as email, SMS, MMS, instant messages, calendar, contact, blog and wiki, etc. All the concepts, methods, work flow, correlation computing methods and system architectures can be extended to other objects such as music, video, and so on.

The various embodiments of the invention can be implemented with the help of computer program code that resides in a memory and causes the relevant apparatuses to carry out the invention. For example, a terminal device may comprise circuitry and electronics for handling, receiving and transmitting data, computer program code in a memory, and a processor that, when running the computer program code, causes the terminal device to carry out the features of an embodiment. Yet further, a network device may comprise circuitry and electronics for handling, receiving and transmitting data, computer program code in a memory, and a processor that, when running the computer program code, causes the network device to carry out the features of an embodiment.

It is obvious that the present invention is not limited solely to the above-presented embodiments, but it can be modified within the scope of the appended claims.

What is claimed is:

1. A method comprising:
   obtaining picture description information from a picture source, wherein the picture description information having been formed by adding at least one of a time, a location, or user information to the picture description information,
   obtaining annotation information from at least two object sources, wherein the at least two object sources are different from said picture source,
   fusing said annotation information from said at least two object sources to form fused annotation information, wherein fusing the annotation information includes:
      selecting content for annotation from the annotation information from the at least two object sources by parsing the annotation information into a text format and selecting relevant text,
      assigning a score value to each sentence from the selected relevant text based upon relevancy and redundancy in comparison with other sentences from the selected relevant text;
      filtering, using assigned score values for the selected content, to reduce irrelevant or redundant information by removing stigma words and repetitive information, wherein repetitive information comprises selected content that overlaps in subject matter, and
      enhancing the cohesion or coherence of the content by at least arranging the text with topically related themes to reduce non-fluency, and
   attaching said fused annotation information to a picture to create an object note for said picture.

2. A method according to claim 1, further comprising:
   forming a hyper-object-link between said picture and at least one object source, wherein said hyper-object-link comprises a link to an object in said object source, and attaching said link to said object to said picture to create an object note for a picture.

3. A method according to claim 1, further comprising:
   forming relevance information by automatically analyzing information from said two sources against information from said picture source, and
   obtaining said annotation information from said at least two sources based on said relevance information.

4. A method according to claim 3, further comprising:
   forming said relevance information by determining a correlation between the picture and the at least two sources by determining their similarity using at least one of the group of time information, location information, event information and person information, and
   forming a weighted similarity indicator by using the at least one of the group of time information, location information, event information and person information.

5. A method according to claim 1, wherein said at least two sources comprise at least two of the group of email messages, short messages, multimedia messages, instant messages, calendar entries, contact cards, blog entries, wiki entries and social network service entries.

6. A method according to claim 1, further comprising:
   clustering pictures based on said annotation information from said at least two sources.

7. A method according to claim 1, further comprising:
   receiving filter information or source selection information from the user for restricting the data from said at least two sources.

8. A method according to claim 1, wherein forming the fused annotation information comprises:
   generating summarization of the content through natural language processing.

9. The method according to claim 1, wherein filtering the selected content to reduce irrelevant or redundant information comprises:
   determining a ratio of overlap in subject matter of the selected content, and
   removing content from at least one of the at least two object sources, in an instance in which the ratio of overlap satisfies a specified degree.

10. An apparatus comprising at least one processor, and memory including computer program code, the memory and the computer program code configured to, with the at least one processor, cause the apparatus to perform at least the following:
    obtain picture description information from a picture source, wherein the picture description information having been formed by adding at least one of a time, a location, or user information to the picture description information,
    obtain annotation information from at least two object sources, wherein the at least two object sources are different from said picture source,
    fuse said annotation information from said at least two object sources to form fused annotation information, wherein fusing the annotation information includes:
       select content for annotation from the annotation information from the at least two object sources by parsing the annotation information into a text format and selecting relevant text,
       assign a score value to each sentence from the selected relevant text based upon relevancy and redundancy in comparison with other sentences from the selected relevant text;
       filter, using assigned score values for the selected content, to reduce irrelevant or redundant information by removing stigma words and repetitive information, wherein repetitive information comprises selected content that overlaps in subject matter, and
       enhance the cohesion or coherence of the content by at least arranging the text with topically related themes to reduce non-fluency, and attach said fused annotation information to a picture to create an object note for said picture.

11. An apparatus according to claim 10, further comprising computer program code configured to, with the at least one processor, cause the apparatus to perform at least the following:
form a hyper-object-link between said picture and at least one object source, wherein said hyper-object-link comprises a link to an object in said object source, and
attach said link to said object to said picture to create an object note for a picture.

12. An apparatus according to claim 10, further comprising computer program code configured to, with the at least one processor, cause the apparatus to perform at least the following:
form relevance information by automatically analyzing information from said two sources against information from said picture source, and
obtain said annotation information from said at least two sources based on said relevance information.

13. An apparatus according to claim 12, further comprising computer program code configured to, with the at least one processor, cause the apparatus to perform at least the following:
form said relevance information by determining a correlation between the picture and the at least two sources by determining their similarity using at least one of the group of time information, location information, event information and person information, and
form a weighted similarity indicator by using the at least one of the group of time information, location information, event information and person information.

14. An apparatus according to claim 10, wherein said at least two sources comprise at least two of the group of email messages, short messages, multimedia messages, instant messages, calendar entries, contact cards, blog entries, wiki entries and social network service entries.

15. An apparatus according to claim 10, further comprising computer program code configured to, with the at least one processor, cause the apparatus to perform at least the following:
cluster pictures based on said annotation information from said at least two sources.

16. An apparatus according to claim 10, further comprising computer program code configured to, with the at least one processor, cause the apparatus to perform at least the following:
receive filter information or source selection information from the user for restricting the data from said at least two sources.

17. An apparatus according to claim 10, further comprising computer program code configured to, with the at least one processor, cause the apparatus to perform at least the following for forming the fused annotation information:
generate summarization of the content through natural language processing.

18. An apparatus according to claim 10, further comprising computer program code configured to, with the at least one processor, cause the apparatus to perform at least the following for filtering the selected content to reduce irrelevant or redundant information:
determining a ratio of overlap in subject matter of the selected content, and
removing content from at least one of the at least two object sources, in an instance in which the ratio of overlap satisfies a specified degree.

19. A computer program product comprising at least one non-transitory computer readable medium having computer executable program code portions stored thereon, the computer executable program code portions comprising program instructions configured for:
obtaining picture description information from a picture source, wherein the picture description information having been formed by adding at least one of a time, a location, or user information to the picture description information,
obtaining annotation information from at least two object sources, wherein the at least two object sources are different from said picture source,
fusing said annotation information from said at least two object sources to form fused annotation information, wherein fusing the annotation information includes:
selecting content for annotation from the annotation information from the at least two object sources by parsing the annotation information into a text format and selecting relevant text,
assigning a score value to each sentence from the selected relevant text based upon relevancy and redundancy in comparison with other sentences from the selected relevant text;
filtering, using assigned score values for the selected content, to reduce irrelevant or redundant information by removing stigma words and repetitive information, wherein repetitive information comprises selected content that overlaps in subject matter, and
enhancing the cohesion or coherence of the content by at least arranging the text with topically related themes to reduce non-fluency, and
attaching said fused annotation information to a picture to create an object note for said picture.

20. A network service comprising at least one server and at least one user device providing to a user at least the following:
picture description information from a picture source, wherein the picture description information having been formed by adding at least one of a time, a location, or user information to the picture description information,
annotation information from at least two object sources, wherein the at least two object sources are different from said picture source,
fused annotation information formed by fusing said annotation information from said at least two object sources, wherein fusing the annotation information includes:
selecting content for annotation from the annotation information from the at least two object sources by parsing the annotation information into a text format and selecting relevant text,
assigning a score value to each sentence from the selected relevant text based upon relevancy and redundancy in comparison with other sentences from the selected relevant text;
filtering, using assigned score values for the selected content, to reduce irrelevant or redundant information by removing stigma words and repetitive information, wherein repetitive information comprises selected content that overlaps in subject matter, and
enhancing the cohesion or coherence of the content by at least arranging the text with topically related themes to reduce non-fluency, and an object note for a picture by attaching said fused annotation information to said picture.

\* \* \* \* \*